United States Patent
Su et al.

(10) Patent No.: US 10,237,454 B2
(45) Date of Patent: Mar. 19, 2019

(54) METHOD FOR DETECTING TERMINAL STATIC LAYER INFORMATION, TERMINAL AND TELEVISION

(71) Applicants: HISENSE ELECTRIC CO., LTD., Qingdao (CN); HISENSE USA CORPORATION, Suwanee, GA (US); HISENSE INTERNATIONAL CO., LTD., Qingdao (CN)

(72) Inventors: Hui Su, Qingdao (CN); Xin Li, Qingdao (CN); Qingxiao Yu, Qingdao (CN)

(73) Assignees: HISENSE ELECTRIC CO., LTD., Shandong (CN); HISENSE USA CORPORATIONGA (US); HISENSE INTERNATIONAL CO., LTD., Shandong (CN)

( * ) Notice: Subject to any disclaimer, the term of this patent is extended or adjusted under 35 U.S.C. 154(b) by 113 days.

(21) Appl. No.: 15/394,716

(22) Filed: Dec. 29, 2016

(65) Prior Publication Data

US 2018/0013931 A1 Jan. 11, 2018

(30) Foreign Application Priority Data

Jul. 7, 2016 (CN) .......................... 2016 1 0533022

(51) Int. Cl.
*H04N 5/14* (2006.01)
*H04N 9/12* (2006.01)
(Continued)

(52) U.S. Cl.
CPC ................. *H04N 5/14* (2013.01); *G09G 5/14* (2013.01); *H04N 9/12* (2013.01); *H04N 5/44504* (2013.01)

(58) Field of Classification Search
CPC combination set(s) only.
See application file for complete search history.

(56) References Cited

U.S. PATENT DOCUMENTS

| 5,617,144 A | * | 4/1997 | Lee | .......................... H04N 19/51 |
| | | | | 348/699 |
| 6,147,684 A | * | 11/2000 | Nielsen | .................... G06F 3/011 |
| | | | | 715/788 |
| 2007/0008442 A1 | | 1/2007 | Ishigaki et al. | ................. 349/42 |

FOREIGN PATENT DOCUMENTS

| CN | 103425452 A | 12/2013 |
| CN | 104363502 A | 2/2015 |
| CN | 105635792 A | 6/2016 |

OTHER PUBLICATIONS

The Chinese First Examination Report of corresponding China patent application No. 201610533022.3, dated Aug. 9, 2018.

* cited by examiner

*Primary Examiner* — Van N Chow
(74) *Attorney, Agent, or Firm* — J.C. Patents

(57) ABSTRACT

Embodiments of present application relate to a method for detecting terminal static layer information, a terminal and a television. Based on the fact that a static layers in the terminal such as the OSD display layer and third-party application are managed as a whole by the terminal layer management module, this embodiment sets forth that: a current topmost layer is determined according to number information of each layer in a terminal layer management module; then a pixel value of a preset region in the topmost layer is obtained; analysis is performed on the pixel value in the preset region, and it is determined whether the pixel value of the preset region is different from a target pixel value. If the pixel value of the preset region is different from (Continued)

the target pixel value, then it is determined that there is image content in the topmost layer.

14 Claims, 8 Drawing Sheets

(51) Int. Cl.
    *G09G 5/14*          (2006.01)
    *H04N 5/445*       (2011.01)

METHOD FOR DETECTING TERMINAL STATIC LAYER INFORMATION, TERMINAL AND TELEVISION

CROSS-REFERENCE TO RELATED APPLICATIONS

This application claims priority to Chinese Patent Application No. 201610533022.3, filed on Jul. 7, 2016, entitled "Method for Detecting Terminal Static Layer Information and Terminal", the content of which is incorporated by reference in its entirety.

TECHNICAL FIELD

This application relates to image processing technology and, more particularly, to a method for detecting terminal static layer information, a terminal and a television.

BACKGROUND

With the development of television (TV) technology, TV plays an important role in people's life. In order to provide users with a clearer and smoother output image, image processing technology is typically used in TV.

Currently, most image processing technologies only deal with dynamic images, such as Motion Estimate and Motion Compensation (MEMC) dynamic image technology. This technology is also known as "120 Hz screen stabilization technology", that is, by way of digital frame interpolation, the field frequency of TV signal is increased from 60 Hz to 120 Hz. The transition between image frames is achieved and becomes smoother by MEMC, thus motion jitter and motion smear are eliminated while motion picture display on the TV is improved. However, the TV image is displayed in a layered mechanism, for example, the television program is an independent video layer image, and the channel information list is an On Screen Display (OSD) layer image. In addition, if a third-party application in the TV system is activated, a corresponding layer will also be created to display an interface image related to the application, and the output image of the TV is usually formed by superimposing the images of several layers. If the superimposed image includes a static image, and the image continues to be processed using MEMC technology, then appearances like distortion, broken and so may be generated in the processed image, which may result in a poor TV image display. Therefore, in order to get a better TV image display effect, knowing accurately a display state of the current TV image is needed, so as to turn on or off the dynamic image processing function according to the display state of each layer of image.

In the related art, the turn-on or turn-off of the dynamic image processing function can be controlled by detecting whether a static image layer is created, for example, by determining the number of layers to determine whether the OSD display or a third-party application is turned on.

SUMMARY

The present application provides a method for detecting terminal static layer information, a terminal and a television.

In a first aspect, an embodiment of the present application provides a method for detecting terminal static layer information, the method includes:

determining a current topmost layer according to number information of each layer in a terminal layer management module;

obtaining a pixel value of a preset region in the topmost layer;

determining whether the pixel value of the preset region is different from the target pixel value;

determining that there is image content in the topmost layer, if the pixel value of the preset region is different from the target pixel value.

In a second aspect, an embodiment of the present application provides a terminal, including:

a memory, configured to store instructions; a processor coupled to the memory, configured to execute instructions stored in the memory, and the processor is configured to:

determine a current topmost layer according to number information of each layer in a terminal layer management module;

obtain a pixel value of a preset region in the topmost layer;

determine whether the pixel value of the preset region is different from a target pixel value;

determine that there is image content in the topmost layer, if the pixel value of the preset region is different from the target pixel value.

In a third aspect, an embodiment of the present application provides a television, including:

a memory, configured to store instructions; a processor coupled to the memory, configured to execute instructions stored in the memory, and the processor configured to:

determine a current topmost layer according to number information of each layer in a terminal layer management module;

obtain a pixel value of a preset region in the topmost layer;

determine whether the pixel value of the preset region is different from a target pixel value;

determine that there is image content in the topmost layer, if the pixel value of the preset region is different from the target pixel value.

BRIEF DESCRIPTION OF DRAWINGS

The accompanying drawings, which are incorporated in and constitute a part of this description, illustrate embodiments consistent with the application, and together with the description, serve to explain the principles of the application.

In order to illustrate the technical solutions of the embodiments of the present application or the solutions of the related art more clearly, the drawings which are required to be used in the description of the embodiments or the related art will be briefly described below. It will be apparent to those skilled in the art that other drawings may also be obtained from these drawings without inventive labor.

DESCRIPTION OF EMBODIMENTS

Exemplary embodiments will herein be described in detail, examples of which are illustrated in the accompanying drawings. When the following description relates to the accompanying drawings, like numerals refer to the same or similar elements unless otherwise indicated. The implementation forms described in the following exemplary embodiments do not represent all the implementation forms in conformity with the present application. Rather, they are merely examples of apparatus and methods consistent with some aspects of the application as discussed in the appended claims.

A terminal device in the embodiment of the present application may be a television, a mobile phone, a tablet computer, a computer or the like.

Figure 1:
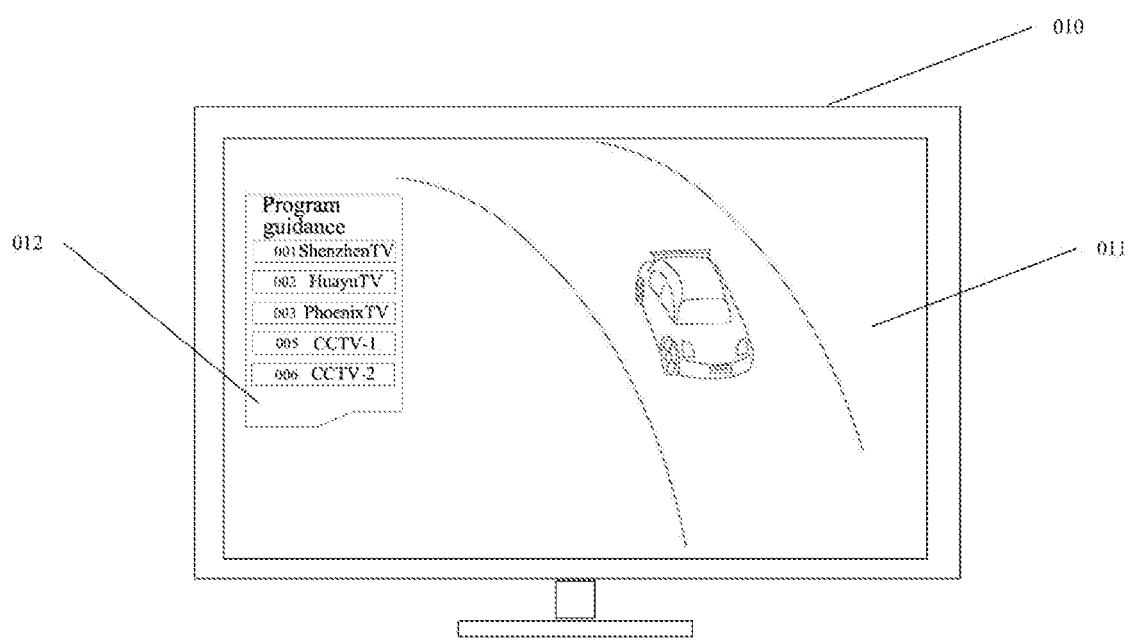
FIG. 1 is a schematic diagram of a terminal display scenario provided by some embodiments of the present application.

FIG. 1 is a schematic diagram of a scenario provided by an embodiment of the present application. As illustrated in FIG. 1, a terminal 010 is included in the diagram, and a video layer image 011 and an OSD layer image 012 are included in a display screen of the terminal 010. With the method for detecting terminal static layer information of the present embodiment, it is possible to detect whether a corresponding layer has image content when the OSD layer image 012 is displayed on the terminal screen.

Figure 2:
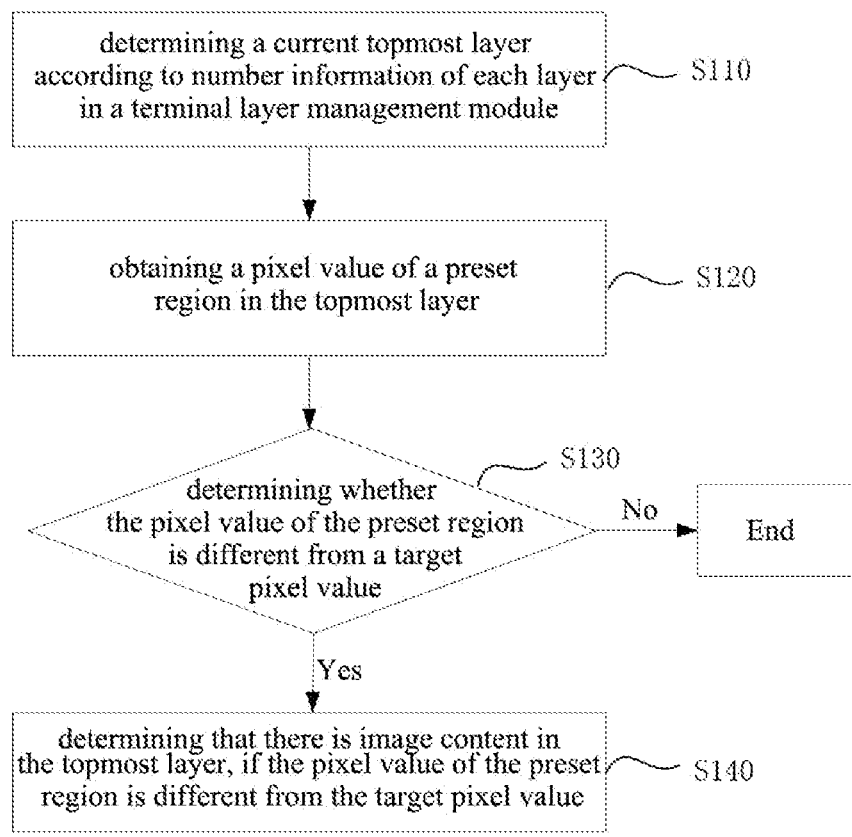
FIG. 2 is a schematic flowchart of a method for detecting terminal static layer information provided by some embodiments of the present application.

With reference to FIG. 2, FIG. 2 is a schematic flowchart of a method for detecting terminal static layer information provided by some embodiments of the present application. As shown in FIG. 2, the detecting method can be applied to the terminal 010 in FIG. 1, a system of the terminal 010 is Android system, and the method includes the steps of:

S110: determining a current topmost layer according to number information of each layer in a terminal layer management module.

In the Android system, static layers, such as an OSD layer and a third-party application layer in the terminal are managed as a whole by the terminal layer management module SurfaceFlinger which manages layers that to be displayed in different layers, and allocates a number to each layer. Typically the layer with the largest number is the current topmost layer, that is, the static layer in the terminal.

The present embodiment determines the currently topmost layer by traversing each layer in the SurfaceFlower and analyzing the number of each layer.

S120: obtaining a pixel value of a preset region in the topmost layer.

Figure 3:
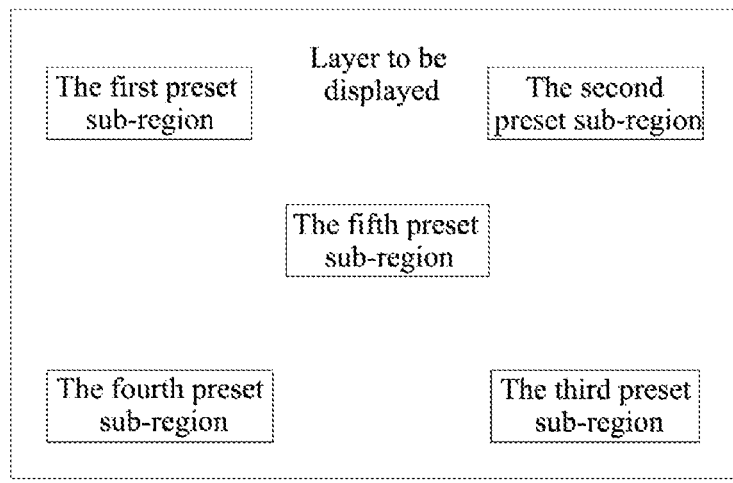
FIG. 3 is a schematic structural view of a preset region in a topmost layer provided by some embodiments of the present application.

In the embodiment of the present application, the preset region may be the entire topmost layer, or one or several regions selected from the topmost layers. As shown in FIG. 3, for the accuracy of data sampling, the present embodiment selects five rectangular sub-regions located at the four corners and the center in the topmost layer as the preset region. It should be noted that the size, shape, and constitution form of the preset region are not defined specifically by this embodiment.

Further, in the case that the pixel values of the preset region are obtained, the RGB pixel values of all the pixels in the preset region can be obtained respectively, and the obtained RGB pixel values of the pixel points can be averaged and processed, thus serve as RGB pixel values of the preset region.

S130: determining whether the pixel value of the preset region is different from a target pixel value.

In a terminal system, if the topmost layer is processed as a transparent layer subsequently, the pixel value of the layer is usually a fixed value set by the system. Therefore, the target pixel value may be the pixel value preset by the system; alternatively, if the preset region is composed of a plurality of sub-regions, the target pixel value may be a pixel value of a sub-region in the preset region, i.e., a pixel value of a sub-region is selected as a target pixel value.

For example, if the preset area is composed of only one sub-region, the pixel values of all the pixels in the preset region may be sequentially compared with the target pixel value set by the system, and it is determined whether there exists a pixel value of the pixel different from the target pixel value, alternatively, a mean of pixel values of all the pixels in the preset region is calculated, and then a obtained mean pixel value is compared with the target pixel value set by the system. If the preset region is composed of a plurality of sub-regions, one sub-region may be selected from the sub-regions and the pixel value of the selected sub-region may be set as a target pixel value, and then the remaining sub-regions may be successively compared with the target region.

If the pixel value of the preset region is different from the target pixel value, step S140 is performed; conversely, if the pixel value of the preset region is the same as the target pixel value, that is, the pixel value of each sub-region in the preset region is the same as the target pixel value, then the topmost layer is transparent, and the flow ends.

S140: determining that there is image content in the topmost layer, if the pixel value of the preset region is different from the target pixel value.

In the embodiment of the present application, if there exists a pixel value of the sub-region in the preset region that is different from the target pixel value, then there is image content in the topmost layer, and the turn-off of the dynamic image processing function can be controlled according to the determining result.

As can be seen from the above technical solutions, the detecting method provided by the present embodiment can not only determine a static layer such as an OSD display layer and a third-party application layer in a terminal, but also identify that a static layer has image content or is transparent according to the analysis for the specific pixel information of static layer. Thus it is possible to accurately control the turn-on or turn-off of the dynamic image processing function according to the identifying result, and the terminal output picture quality is improved.

In an embodiment of the present application, step S120 in the embodiment shown in FIG. 2 may include the steps of:

S1201: obtaining the RGB pixel value of all the pixels in the preset region of the topmost layer.

The RGB pixel values $I_{xy}=[I_{xy}^{R}, I_{xy}^{G}, I_{xy}^{B}]$ of all the pixels in the preset area are extracted respectively, where x and y respectively indicate the position coordinates of the pixel in the topmost layer.

S1202: calculating the mean of the RGB pixel values in the preset region according to the RGB pixel values of all the pixels in the preset region.

Means of the three primary colors of RGB pixel values are respectively calculated according to the RGB pixel values of all the pixels in the preset region, and the mean $\bar{I}_{xy}=[\bar{I}_{xy}^{R}, \bar{I}_{xy}^{G}, \bar{I}_{xy}^{B}]$ of RGB pixel value in the preset region is obtained. Of course, the RGB pixel values corresponding to all the pixels can also be internally calculated before the mean is calculated.

S1203: setting the mean of the RGB pixel value in the preset region as the pixel value of the preset region.

However, if the preset region is composed of a plurality of sub-regions, the mean of the pixels of sub-regions may also be calculated respectively by the above-mentioned steps, for example, the preset region is composed of five sub-regions. By the above steps, the pixel values of the five sub-regions can be obtained, and they are $\bar{I}_{1xy}, \bar{I}_{2xy}, \bar{I}_{3xy}, \bar{I}_{4xy}$, and $\bar{I}_{5xy}$, respectively.

As the terminal layer is composed of a large number of pixels, the amount of pixel information is very large, if comparative analysis is performed on each pixel in the preset region of the entire layer, the amount of data to be processed will be very large. Therefore, the present embodiment calculates the mean of pixel values of the pixels in the sub-region by using the selected sub-region, and then performs comparative analysis so that the amount of data to be processed can be reduced and the data processing speed can be improved.

However, the present application is not limited to calculating the mean of the pixel values in the selected preset region, it is also possible to perform analysis by using pixels whose pixel coordinate values are odd or even in the preset region, or pixels can be selected in accordance with other rules to perform operational analysis, which will not be specifically defined by the present embodiment.

In another embodiment of the present application, step S130 in the embodiment shown in FIG. 2 may include:

The preset region is composed of a plurality of sub-regions, and one sub-region is determined from the plurality of sub-regions as a target region. In this case the pixel value of the target region is the target pixel value.

Determining whether the pixel value of the sub-regions other than the target region is different from the target pixel value.

For example, a preset region consists of five sub-regions, i.e., the four corners and the center in the topmost layer, and the sub-region of the center is selected as the target region, then the mean of the pixel values of all the pixels in the target region is calculated and the mean pixel value of the target region is taken as the target pixel value $I_0$, then, the mean pixel values of the sub-regions of the remaining four corner positions are respectively calculated; finally, the calculated mean pixel values of the sub-regions of the four corner positions are comparatively analyzed with the target pixel value $I_0$.

Figure 4:
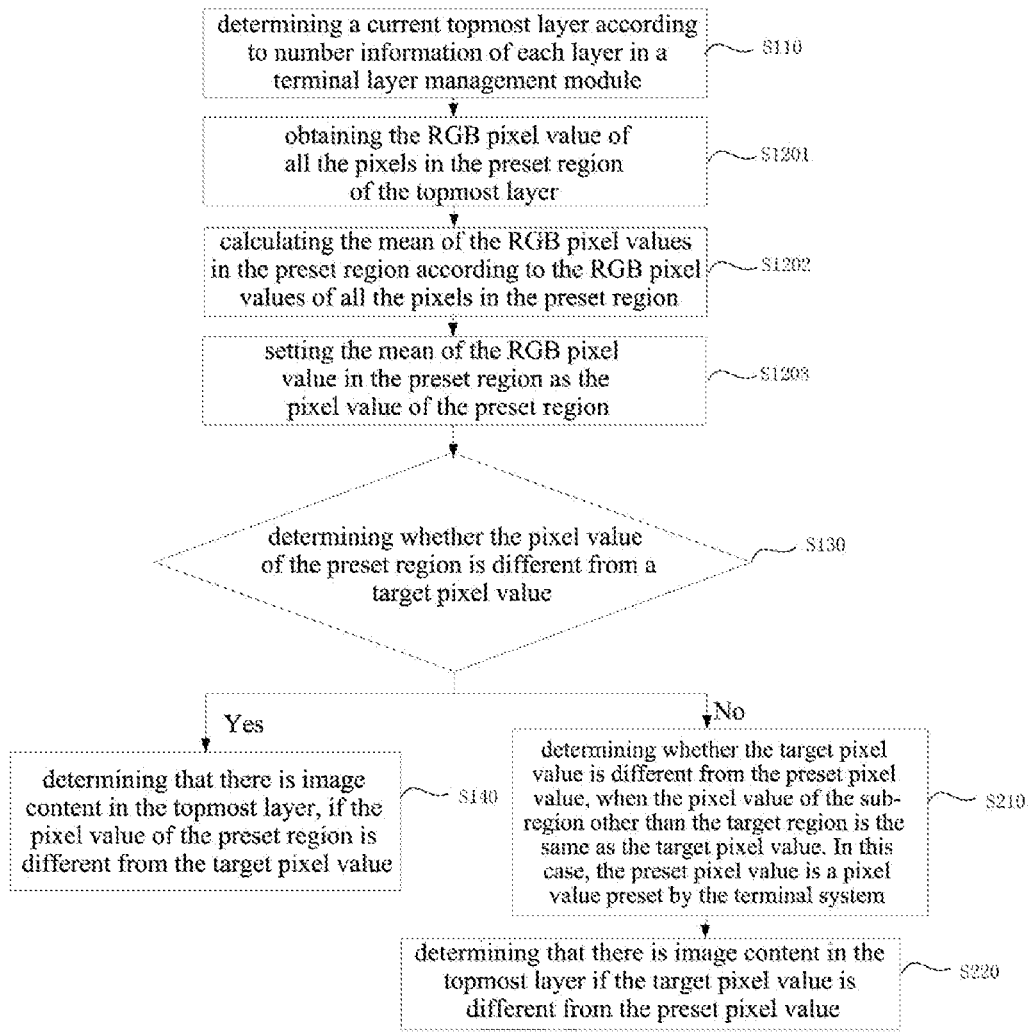
FIG. 4 is a schematic flowchart of a method for detecting terminal static layer information provided by yet some embodiments of the present application.

With reference to the above-mentioned embodiments, in another embodiment of the present application, FIG. 4 is a schematic flowchart of a method for detecting terminal static layer information provided by yet some embodiments of the present application. As shown in FIG. 4, the present embodiment may further include the steps of:

S210: determining whether the target pixel value is different from the preset pixel value, when the pixel value of the sub-region other than the target region is the same as the target pixel value. In this case, the preset pixel value is a pixel value preset by the terminal system.

In the embodiment of the present application, when pixel values of all sub-region in the preset region are the same as the target pixel value, i.e., the pixel values of all the sub-regions are same. In order to avoid the case that the selected sub-regions are just the same solid color region, the embodiment further compares the target pixel value with the preset pixel value of the terminal system. If the target pixel value is different from the preset pixel value, then there is image content in the topmost layer and step S220 is performed. Otherwise, if the target pixel value is the same as the preset pixel value, then the topmost layer is transparent, and the flow ends.

S220: determining that there is image content in the topmost layer if the target pixel value is different from the preset pixel value.

In the method provided by the present embodiment, when the pixel values of all the sub-regions in the preset region are the same, by adding a step of comparing the obtained target pixel value with the pixel value preset by the system, it is possible to prevent the possibility of erroneous determining due to the fact that a solid color region is selected as a preset region, and to improve the accuracy of the data processing.

Figure 5:
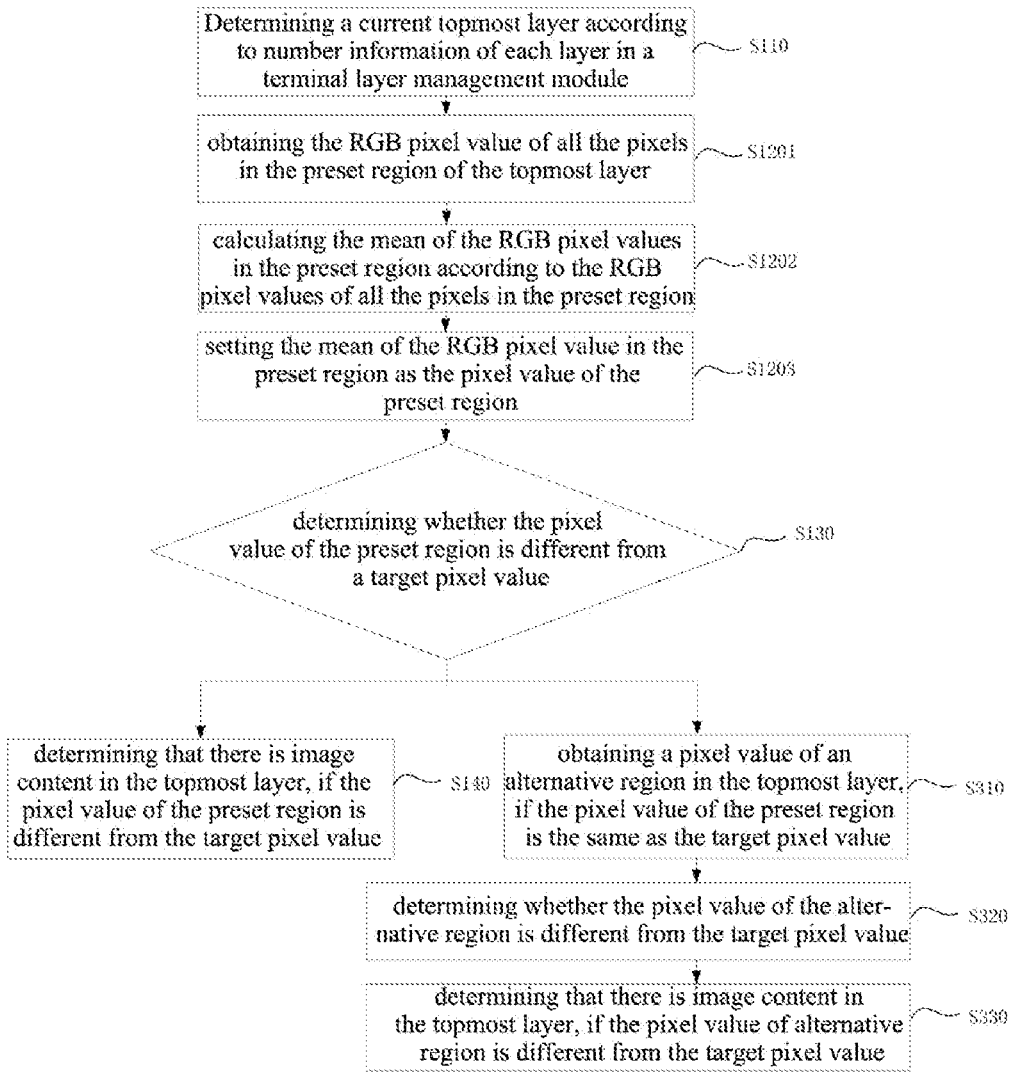
FIG. 5 is a schematic flowchart of a method for detecting terminal static layer information provided by yet some embodiments of the present application.

In yet another embodiment of the present application, FIG. 5 is a schematic flowchart of a method for detecting terminal static layer information provided by yet some embodiments of the present application. As shown in FIG. 5, the present embodiment may further include the steps of:

S310: obtaining a pixel value of an alternative region in the topmost layer, if the pixel value of the preset region is the same as the target pixel value.

In the embodiment of the present application, in order to make a more accurate determining on the attribute of the topmost layer, if the pixel value of the preset region and the target pixel value are the same, an additional region is further selected as the alternative region in the topmost layer. In this case, in order to prevent the selected alternative region from missing the portion with the image content in the topmost layer by coincidence, the present embodiment adopts a manner of stepwise enlarging the preset region to perform analysis, i.e., the alternative region is set at a position close to the preset region. However, the alternative region may also be selected at other locations on the screen, for example, in step S120, the preset region is set at the center of the topmost layer, and then the alternative region is set at the corner position of the topmost layer.

S320: determining whether the pixel value of the alternative region is different from the target pixel value.

If the pixel value of the alternative region is different from the target pixel value, then there is the image content in the topmost layer, and step S330 is performed. Otherwise, if the pixel value of the alternative region is the same as the target pixel value, then the topmost layer is transparent, and the flow ends.

S330: determining that there is image content in the topmost layer, if the pixel value of alternative region is different from the target pixel value.

However, when the pixel value of the alternative region is the same as the target pixel value, it is also possible to continue to select an alternative region from the topmost layer and perform the comparison for pixel values as necessary.

The method for setting the alternative region provided in the present embodiment can not only improve the accuracy of the determining on the attribute of the topmost layer but also reduce the area and the number of the preset regions selected in step 120. Further, it is possible to reduce the amount of data to be processed when pixel analysis of the preset region is performed.

The method for detecting terminal static layer information provided by the present embodiment can be applied not only to controlling the turn-on or turn-off for the dynamic image processing function but also to determining the presence of the third-party application layer using the detecting method provided by the present embodiment in the terminal operated by the touch panel and the terminal operated by the combination of keys, and performing the step of forwarding subsequent key according to the detecting result.

Figure 6:
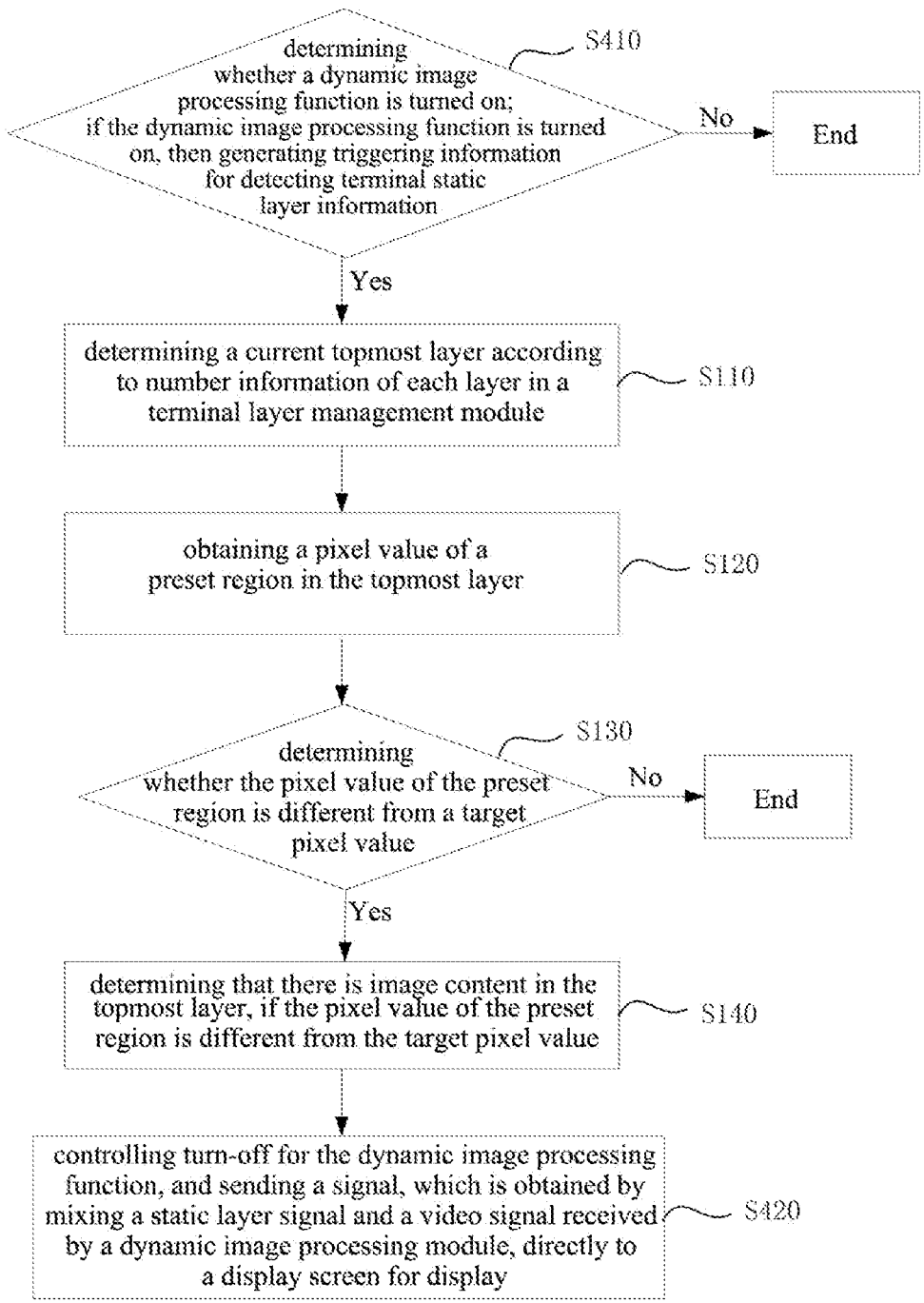
FIG. 6 is a schematic flowchart of a method for detecting terminal static layer information provided by yet some other embodiments of the present application.

In another embodiment of the present application, FIG. 6 is a schematic flowchart of another method for detecting terminal static layer information provided by yet some other embodiments of the present application. When the detecting method provided in the present embodiment is applied to controlling the turn-on or turn-off for the dynamic image processing function, as shown in FIG. 6, the method further includes the steps of:

S410: determining whether a dynamic image processing function is turned on; if the dynamic image processing function is turned on, then generating triggering information for detecting terminal static layer information.

It is necessary to determine whether the dynamic image processing function is turned on, and if the dynamic image processing function is turned on, then the triggering information for detecting the terminal static layer information is generated, that is, if the dynamic image processing function of the terminal system is turned on, then Step 110 is performed.

Further, after Step S140, the method further including:

S420: controlling turn-off for the dynamic image processing function, and sending a signal, which is obtained by mixing a static layer signal and a video signal received by a dynamic image processing module, directly to a display screen for display.

In the terminal system, if the dynamic image processing function is turned off, the processed video signal and the static layer signal (including the OSD signal and the third-party application layer signal) are mixed and transmitted to the dynamic image processing module, and then the signal is transmitted by the dynamic image processing module to the display screen for display. If the dynamic image processing module is turned on, the processed video signal and the static layer signal are mixed and transmitted to the dynamic image processing module, and then the signal is accordingly processed (e.g., digital frame interpolation processing) and transmitted by the dynamic image processing module to the display screen for display.

The method for controlling the dynamic image processing function provided by the present embodiment is characterized in that after detecting the OSD layer or the third-party application layer which is to be displayed, it is determined whether there is image content in the layer by analyzing a pixel of the layer. If there is image content, then it is determined that the static layer is displayed, and the dynamic image processing function is turned off. Therefore, the case that the dynamic image processing function is mistakenly turned off will be avoided when the OSD layer or the third-party application layer to be displayed is transparent.

Figure 7:
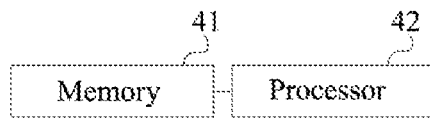
FIG. 7 is a schematic structural view of a terminal provided by some embodiments of the present application.

FIG. 7 is a schematic structural view of a terminal provided by yet some embodiments of the present application; the present application further provides a terminal, as shown in FIG. 7, the terminal includes:

a memory 41, configured to store instructions; a processor 42 coupled to the memory 41 and configured to execute instructions stored in the memory 41, and the processor 42 is configured to:

determine a current topmost layer according to number information of each layer in a terminal layer management module;

obtain a pixel value of a preset region in the topmost layer;

determine whether the pixel value of the preset region is different from a target pixel value;

determine that there is image content in the topmost layer, if the pixel value of the preset region is different from the target pixel value.

The processor 42, configured to: obtain RGB pixel values of all pixels in the preset region of the topmost layer; calculate a mean of the RGB pixel values in the preset region according to the RGB pixel values of all the pixels in the preset region; set the mean of the RGB pixel values in the preset region as the pixel value of the preset region.

The processor 42, configured to: the preset region being composed of a plurality of sub-regions, determine one sub-region from the plurality of sub-regions as a target region. In this case a pixel value of the target region is the target pixel value; determine whether a pixel value of the sub-region other than the target region is different from the target pixel value.

The processor 42 is further configured to: determine whether the target pixel value is different from a preset pixel value when the pixel value of the sub-region other than the target region is the same as the target pixel value. In this case, the preset pixel value is a pixel value preset by a terminal system; determine that there is image content in the topmost layer if the target pixel value is different from the preset pixel value.

The processor 42 is further configured to: obtain a pixel value of an alternative region in the topmost layer, if the pixel value of the preset region is the same as the target pixel value; determine whether the pixel value of the alternative region is different from the target pixel value; determine that there is image content in the topmost layer, if the pixel value of the alternative region is different from the target pixel value.

In this case the alternative region is positioned close to the preset region. The preset region consists of five sub-regions, i.e., the four corners and the center in the topmost layer.

The processor 42 is further configured to: before the determining a current topmost layer according to number information of each layer in a terminal layer management module, determine whether a dynamic image processing function is turned on; if the dynamic image processing function is turned on, then generate triggering information for detecting terminal static layer information.

The processor 42 is further configured to: after the determining that there is image content in the topmost layer, control turn-off for the dynamic image processing function, and send a signal which is obtained by mixing a static layer signal and a video signal received by a dynamic image processing module, directly to a display screen for display.

The terminal of the present embodiment may further be configured to perform any of the methods for detecting terminal static layer information provided by the foregoing embodiments of the present application, the implementation principle of which is similar and need not be repeated herein.

The present embodiment can not only determine a static layer such as an OSD display layer and a third-party application layer in the terminal, but also identifies whether the static layer has the image content or is transparent by analyzing the specific pixel information of the static layer, thus it is possible to accurately control the turn-on or turn-off of the dynamic image processing function according to the identification result and improve the terminal output picture quality.

Figure 8:
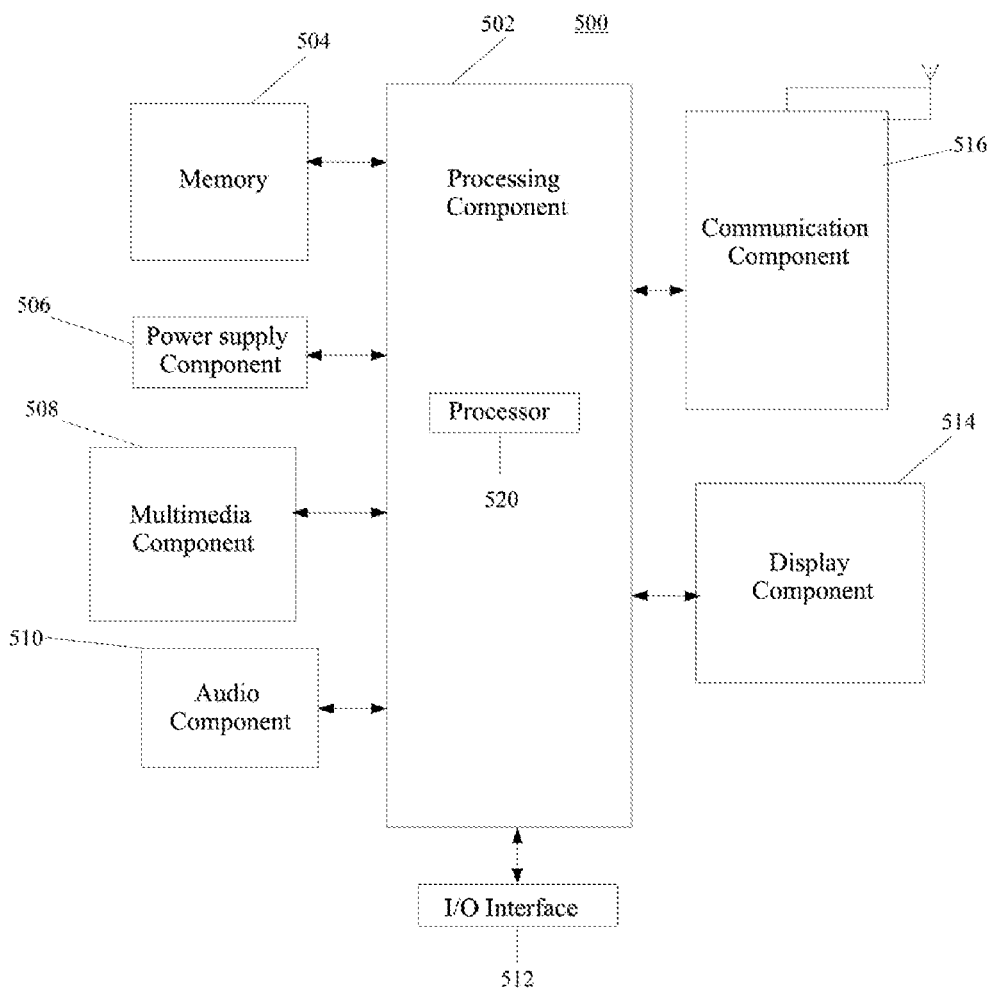
FIG. 8 is a block diagram of a terminal provided by some embodiments of the present application.

FIG. 8 is a block diagram of a terminal 500 provided by yet some embodiments of the present application.

With reference to FIG. 8, the terminal 500 may include one or more components below: a processing component 502, a memory 504, a power supply component 506, a multimedia component 508, an audio component 510, an input/output (I/O) interface 512, a display component 514, and a communication component 516.

The processing component 502 generally controls the overall operation of the terminal 500, such as operations associated with display and data communication. The processing component 502 may include one or more the processors 520 to execute instructions to perform all or part of the steps of the method described above. In addition, the processing component 502 may include one or more modules to facilitate interaction between the processing component 502 and other components. For example, the processing component 502 may include a multimedia module to facilitate interaction between the multimedia component 508 and the processing component 502.

The memory 504 is configured to store various types of data to support operation at the terminal 500. Examples of such data include instructions for any application or method that operates on the terminal 500. The memory 504 may be implemented by any type of volatile or nonvolatile memory device, or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 506 provides power to the various components of the terminal 500. The power supply component 506 may include a power management system, one or more power supplies, and other components associated with generating, managing, and distributing power for the terminal 500.

The multimedia component 508 includes a screen that provides an output interface between the terminal 500 and the user. In some embodiments, the screen may include a liquid crystal display (LCD) and a touch panel (TP). If the screen includes a touch panel, the screen may be implemented as a touch screen to receive an input signal from the user. The touch panel includes one or more touch sensors to sense touch, slide, and gestures on the touch panel. The touch sensor may not only sense the boundary of the touch or slide action, but also detect the duration and pressure associated with the touch or slide operation.

The audio component 510 is configured to output and/or input an audio signal. For example, the audio component 510 includes a microphone (MIC) 1. The received audio signal may be further stored in the memory 504 or transmitted via the communication component 516. In some embodiments, the audio component 510 further includes a speaker for outputting an audio signal. The I/O interface 512 provides an interface 1 between the processing component 502 and a peripheral interface module.

The display component 514 is configured to convert electrical information into visual information to display an output screen to the user. For example, the display component 514 includes a cathode ray tube (CRT) display component, a light emitting diode (LED) display component, an organic light emitting diode display component display, an active matrix organic light emitting diode (AMOLED) display component, and a liquid crystal display (LCD) component.

The communication component 516 is configured to facilitate communication between the terminal 500 and other devices in a wired or wireless manner. The terminal 500 may access a wireless network based on a communication standard such as WiFi, 2G or 3G, or a combination thereof.

The terminal 500 may further include a sensor component, configured to provide the terminal 500 with a state assessment for various aspects. For example, the sensor component may detect an on/off state of the terminal 500.

In an exemplary embodiment, terminal 500 may be implemented by one or more application specific integrated circuits (ASICs), digital signal processors (DSPs), digital signal processing devices (DSPDs), graphics processing units (GPUs), controllers, microcontrollers, microprocessors, or other electronic components for performing the method described above.

In an exemplary embodiment, a non-transitory computer readable storage medium including instructions, e.g., a memory 504 including instructions is also provided, and the foregoing instructions can be executed by the processor 520 of the terminal 500 to perform the method described above. For example, the non-transitory computer-readable storage medium may be a ROM, a random access memory (RAM), an optical data storage device, or the like.

A non-transitory computer-readable storage medium that enables a terminal to perform a method for detecting terminal static layer information when instructions in the storage medium are executed by a processor of a terminal, the method including:

determining a current topmost layer according to a number information of each layer in a terminal layer management module;

obtaining a pixel value of a preset region in the topmost layer;

determining whether the pixel value of the preset region is different from a target pixel value;

determining that there is image content in the topmost layer, if the pixel value of the preset region is different from the target pixel value.

Figure 9:
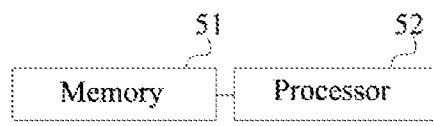
FIG. 9 is a schematic diagram of a structure of the television provided by some embodiments of the present application.

FIG. 9 is a schematic diagram of a structure of a television provided by yet some embodiments of the present application. As shown in FIG. 9, the television includes:

a memory 51, configured to store instructions; a processor 52 coupled to the memory 51, configured to execute instructions stored in the memory 51, and the processor 52 is configured to:

determine a current topmost layer according to number information of each layer in a terminal layer management module;

obtain a pixel value of a preset region in the topmost layer;

determine whether the pixel value of the preset region is different from the target pixel value;

determine that there is image content in the topmost layer, if the pixel value of the preset region is different from the target pixel value.

The present embodiment can not only determine a static layer such as an OSD display layer and a third-party application layer in the terminal, but also identifies whether the static layer has the image content or is transparent by analyzing the specific pixel information of the static layer. Thus it is possible to accurately control the turn-on or turn-off of the dynamic image processing function according to the identifying result and improve the terminal output picture quality.

Other implementation forms of the present application will be readily apparent to those skilled in the art upon considering the specification and practice of the application as set forth herein. This application is intended to cover any variations, uses, or adaptive changes of the application that abide by the general principles of the application and include common general knowledge or conventional technical means in the technical field to which the application is related. It is intended that the specification and embodiments are considered to be exemplary only, with the true scope and spirit of the application being indicated by the following claims.

It is to be understood that the application is not limited to the precise constructions already described and illustrated in the drawings, and that various modifications and changes may be made without departing from the scope thereof. The scope of the application is limited only by the appended claims.

What is claimed is:

1. A method for detecting terminal static layer information, comprising:
    determining a topmost layer according to number information of each layer in a terminal layer management module;
    obtaining a pixel value of a preset region in the topmost layer;
    determining whether the pixel value of the preset region is different from a target pixel value;
    determining that there is image content in the topmost layer, if the pixel value of the preset region is different from the target pixel value.

2. The method for detecting terminal static layer information according to claim 1, wherein the obtaining a pixel value of a preset region in the topmost layer comprises:
    obtaining RGB pixel values of all pixels in the preset region of the topmost layer;
    calculating a mean of the RGB pixel values in the preset region according to the RGB pixel values of all the pixels in the preset region;
    setting the mean of the RGB pixel values in the preset region as the pixel value of the preset region.

3. The method for detecting terminal static layer information according to claim 1, wherein the determining whether the pixel value of the preset region is different from a target pixel value comprises:
    the preset region being composed of a plurality of sub-regions, determining one sub-region from the plurality of sub-regions as a target region, wherein a pixel value of the target region is the target pixel value;
    determining whether a pixel value of the sub-region other than the target region is different from the target pixel value.

4. The method for detecting terminal static layer information according to claim 3, wherein the method further comprises:
    determining whether the target pixel value is different from a preset pixel value when the pixel value of the sub-region other than the target region is the same as the target pixel value, wherein the preset pixel value is a pixel value preset by a terminal system;
    determining that there is image content in the topmost layer if the target pixel value is different from the preset pixel value.

5. The method for detecting terminal static layer information according to claim 1, wherein the method further comprises:
    obtaining a pixel value of an alternative region in the topmost layer, if the pixel value of the preset region is the same as the target pixel value;
    determining whether the pixel value of the alternative region is different from the target pixel value;
    determining that there is image content in the topmost layer, if the pixel value of the alternative region is different from the target pixel value.

6. The method for detecting terminal static layer information according to claim 5, wherein the alternative region is positioned close to the preset region.

7. The method for detecting terminal static layer information according to claim 1, wherein the preset region consists of five sub-regions which are four corners and one center in the topmost layer.

8. The method for detecting terminal static layer information according to claim 1, wherein before the determining a current topmost layer according to number information of each layer in a terminal layer management module, the method further comprises:
    determining whether a dynamic image processing function is turned on;
    if the dynamic image processing function is turned on, then generating triggering information for detecting terminal static layer information.

9. The method for detecting terminal static layer information according to claim 8, wherein after the determining that there is image content in the topmost layer, the method further comprises:
    controlling turn-off for the dynamic image processing function, and sending a signal, which is obtained by mixing a static layer signal and a video signal received by a dynamic image processing module, directly to a display screen for display.

10. A terminal, comprising:
    a memory, configured to store instructions; a processor coupled to the memory, configured to execute instructions stored in the memory, and the processor is configured to:
    determine a topmost layer according to number information of each layer in a terminal layer management module;
    obtain a pixel value of a preset region in the topmost layer;
    determine whether the pixel value of the preset region is different from a target pixel value;
    determine that there is image content in the topmost layer, if the pixel value of the preset region is different from the target pixel value.

11. The terminal according to claim 10, wherein the processor is configured to:
    the preset region being composed of a plurality of sub-regions, determine one sub-region from the plurality of sub-regions as a target region, wherein a pixel value of the target region is a target pixel value;
    determine whether a pixel value of the sub-region other than the target region is different from the target pixel value.

12. The terminal according to claim 11, wherein the processor is further configured to:
    determine whether the target pixel value is different from a preset pixel value when the pixel value of the sub-region other than the target region is the same as the target pixel value, wherein the preset pixel value is a pixel value preset by a terminal system;

determine that there is image content in the topmost layer if the target pixel value is different from the preset pixel value.

13. The terminal according to claim 10, wherein the processor is further configured to:

obtain a pixel value of an alternative region in the topmost layer, if the pixel value of the preset region is the same as the target pixel value;

determine whether the pixel value of the alternative region is different from the target pixel value;

determine that there is image content in the topmost layer, if the pixel value of alternative region is different from the target pixel value.

14. A television, comprising:

a memory, configured to store instructions; a processor coupled to the memory, configured to execute instructions stored in the memory, and the processor is configured to:

determine a topmost layer according to number information of each layer in a terminal layer management module;

obtain a pixel value of a preset region in the topmost layer;

determine whether the pixel value of the preset region is different from a target pixel value;

determine that there is image content in the topmost layer, if the pixel value of the preset region is different from the target pixel value.

* * * * *